(No Model.) 3 Sheets—Sheet 2.
J. McFARLANE.
HYDRAULIC DREDGING.
No. 426,846. Patented Apr. 29, 1890.
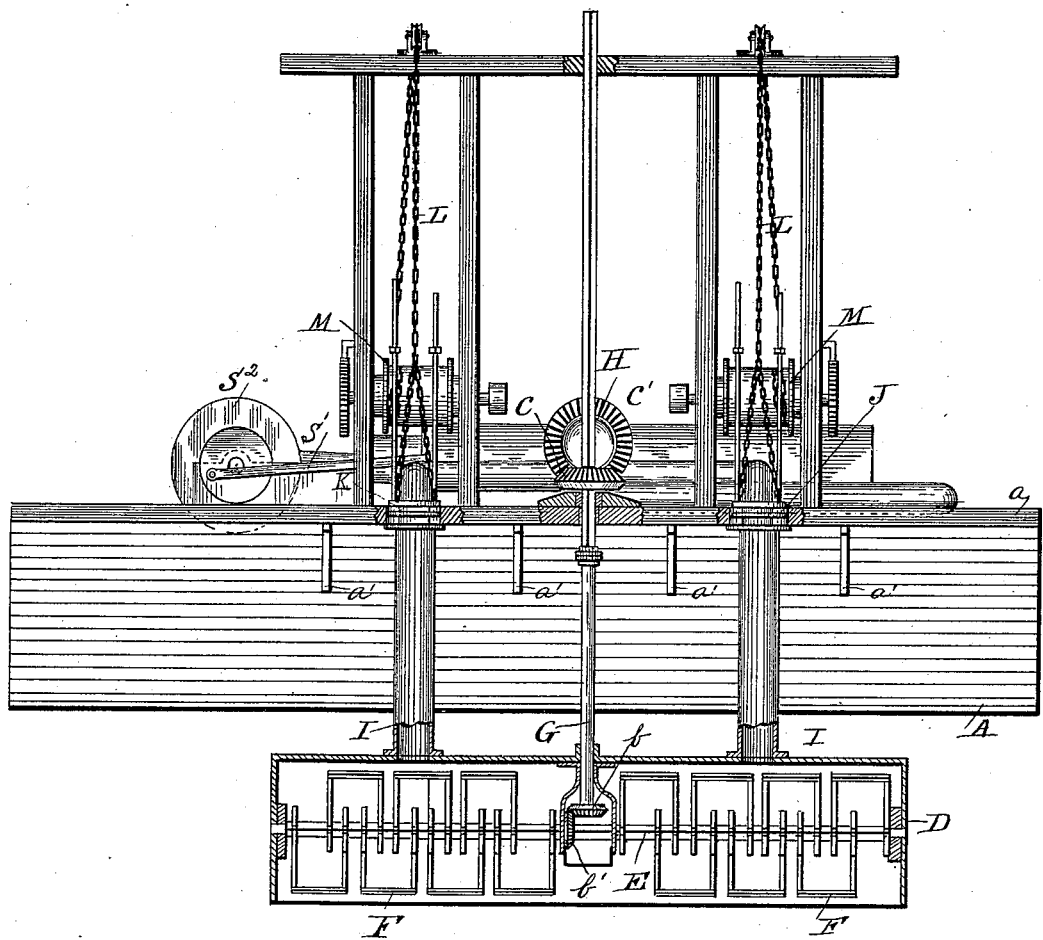
WITNESSES
Jos H Blackwood
INVENTOR
John McFarlane
by Geo. F. Schroeder & Co
Attorney (No Model.) 3 Sheets—Sheet 3.
J. McFARLANE.
HYDRAULIC DREDGING.
No. 426,846. Patented Apr. 29, 1890.
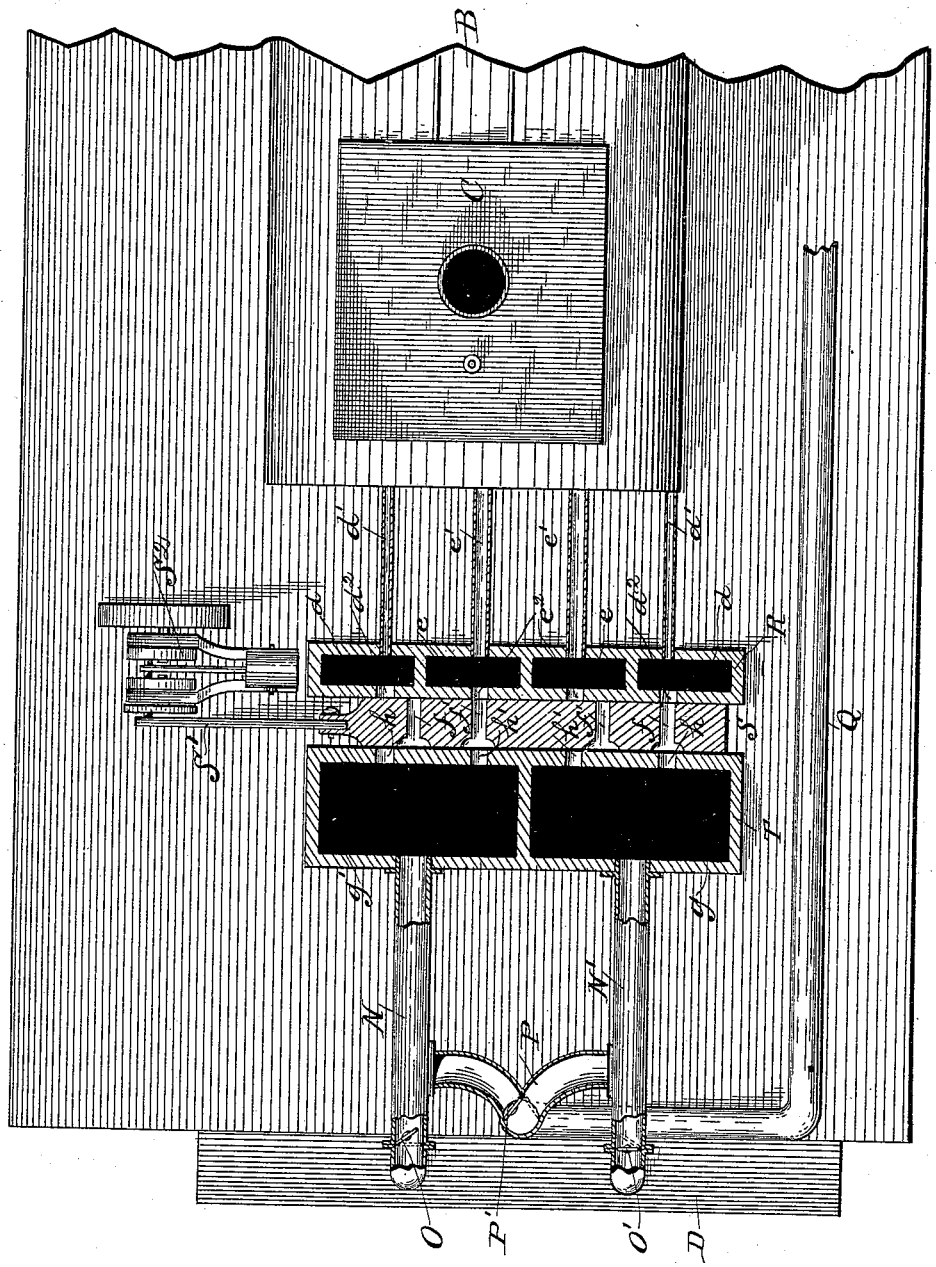
WITNESSES
Jas H Blackwood
M J Clay A.
INVENTOR
John McFarlane
by Geo. G. Schroeder &c.
Attorney

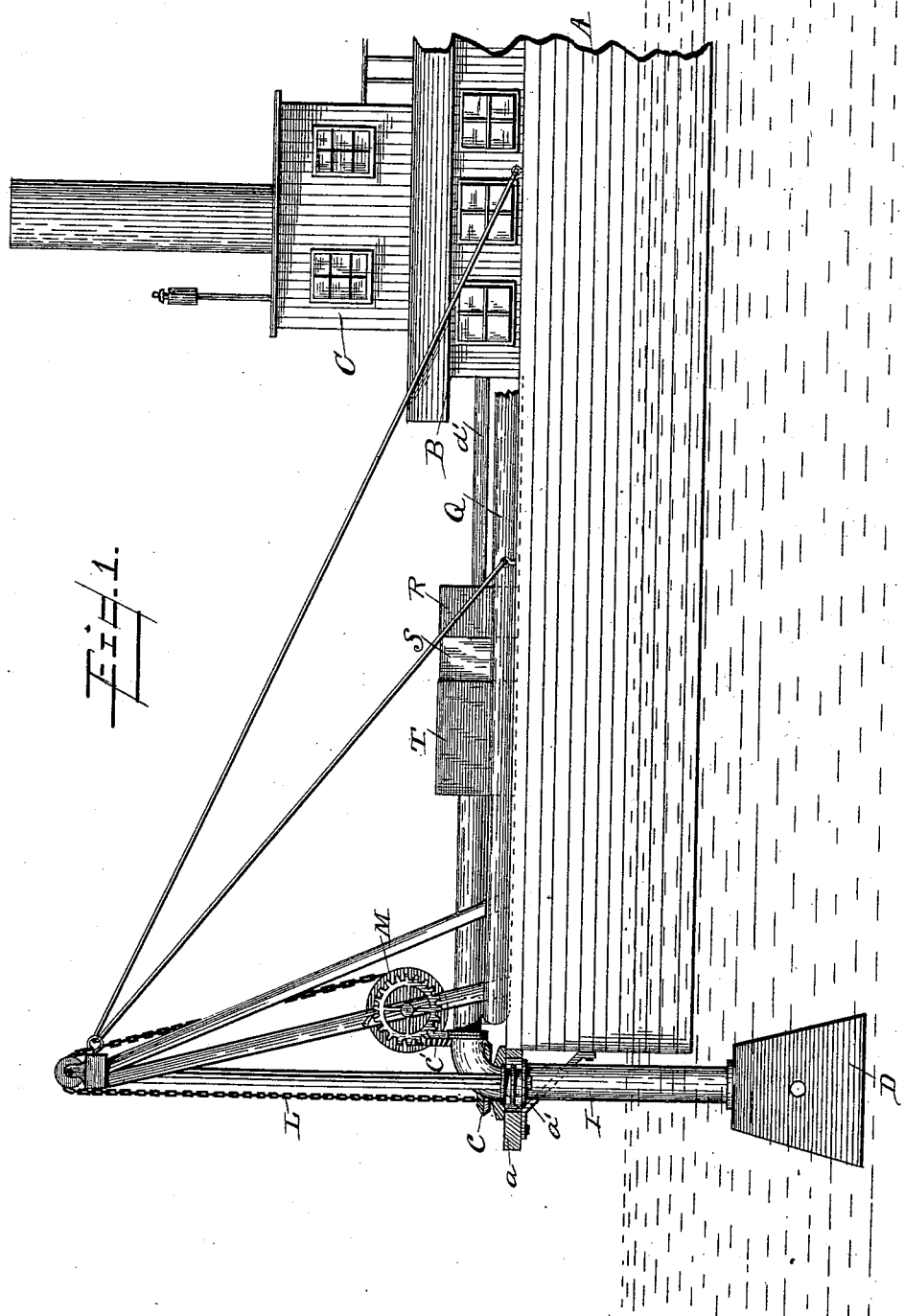

UNITED STATES PATENT OFFICE.

JOHN McFARLANE, OF WASHINGTON, DISTRICT OF COLUMBIA, ASSIGNOR OF TWO-THIRDS TO GEORGE J. BESSLER AND HENRY WEX, BOTH OF SAME PLACE.

HYDRAULIC DREDGING.

SPECIFICATION forming part of Letters Patent No. 426,846, dated April 29, 1890.

Application filed July 31, 1889. Serial No. 319,249. (No model.)

*To all whom it may concern:*

Be it known that I, JOHN MCFARLANE, a citizen of the United States, residing at Washington, in the District of Columbia, have invented certain new and useful Improvements in Hydraulic Dredgers; and I do hereby declare the following to be a full, clear, and exact description of the invention, such as will enable others skilled in the art to which it appertains to make and use the same.

My invention relates to new and useful improvements in dredgers, the object of such invention being to improve the pumping mechanism thereof, the invention consisting in the use, in connection with such dredge and the telescopic suction-pipes thereof, of a double-acting vacuum-pump, such pump and the main portions of the suction-pipes being arranged horizontally of the deck of the dredger, steam and water being admitted to such pump from the ordinary boiler used in such machines, the valve of such pump being driven by any suitable engine, all of which will be hereinafter fully described and specifically claimed.

Reference will be made to the accompanying drawings, in which Figure 1 is a side elevation of a dredge with my improvements thereon, said figure showing the dredge as partly broken away. Fig. 2 is a front view of such parts, the telescopic suction-pipes and box with which they are connected being also shown; and Fig. 3 is a top plan, partly broken away, the pump and certain other parts being shown in section.

Like letters refer to like parts in each view.

In the drawings, A represents the hull of an ordinary dredger, B being the cabin thereof, and C the pilot-house. The deck of the hull is projected forward, as indicated by letter $a$, said projecting ledge being supported by suitable braces $a'$, as shown clearly in Fig. 2.

D represents a box, which is adapted to be lowered below the surface of the water, and in which, mounted upon a horizontal shaft E, are certain cutters F. The shaft E also carries a gear-wheel $b'$, which is arranged to mesh with a gear $b$, the latter mounted upon the lower end of a shaft G, which passes through an opening formed in the projecting ledge $a$, and which carries at a point above such ledge a gear $c$, arranged horizontally and adapted to mesh with a gear $c'$, mounted upon a suitable horizontal shaft H, said shaft being driven by any suitable mechanism, and means being thus provided for the revolution of the cutters F. The box D is open at its lower side, and at its upper side is secured to and communicates with the pipes I, each of such pipes I being connected with suitable other pipes J and K, arranged to telescope one within the other, such telescopic pipes being provided with suitable hoisting mechanism—such as chains L and drums M—all of the parts thus far described being fully explained in Letters Patent No. 401,896, issued to me on the 23d day of April, 1889.

The uppermost sections of the telescopic pipes are connected and communicate with the main suction-pipes N N'. At the point of connection between each telescopic pipe and its suction-pipe there is provided an inwardly-opening valve, the one in connection with pipe N' being marked O' and that in connection with the pipe N being marked O. At a suitable distance from such valves each pipe N N' is connected with a short pipe P, the two such pipes forming a suitable Y, provided with a swinging valve P', arranged to seat upon either of said pipes, the two pipes P also communicating with a discharge-pipe Q.

The pump used in connection with my invention may be described as consisting of the following parts. A box or casing R is divided by suitable partitions into four compartments, two of which are adapted to receive steam, which I have marked $d$, and the remaining two, which receive water, (marked $e$.) Communicating with each compartment $d$ is a steam-inlet pipe $d'$, and communicating with each compartment $e$ is a water-inlet pipe $e'$, each of said steam-inlet pipes passing to the boiler and the water-inlets to a suitable source of water-supply and pressure. The casing R is provided with four openings, one for each compartment $d$ and $e$, the openings for compartments $d$ being marked $d^2$ and those for compartments $e$ being marked $e^2$.

S represents a reciprocating valve provided with a suitable valve-rod S', and driven from any suitable engine, such as S². This valve is provided with four ports, one for each opening $d^2$ and $e^2$, those arranged to communicate with the openings $d^2$ being marked $f$ and those communicating with the openings $e^2$ being marked $f'$. These ports are so arranged that one port $f'$ will communicate with its opening $e^2$ at the same time that one port $f$ is in communication with its corresponding opening $d^2$, the remaining ports $f$ and $f'$ being out of communication with the other ports, each stroke of the engine bringing different sets of ports and openings into communication.

T represents a box or casing divided by suitable partitions into two compartments $g$ $g'$, this box being also provided with four openings, two of which are marked $h$ and the remaining two $h'$, one opening $h$ and one opening $h'$ leading into each compartment $g$ and $g'$, such openings being arranged directly opposite the openings $d^2$ and $e^2$ of casing R, the openings $h$ being opposite the openings $d^2$ and the openings $h'$ being opposite the openings $e^2$. The suction-pipes N N', hereinbefore referred to, communicate with the chambers formed in this box or casing T, the pipe N' communicating with the compartment $g$ and the pipe N with the compartment $g'$.

All the parts of this pump are arranged upon the deck of the dredger and in a horizontal position with respect thereto, as are also the suction-pipes N N' and the discharge-pipe communicating therewith.

The operation of the device is as follows: The box containing the cutters is lowered into the bed of the river or stream to be dredged and the cutters put in operation. The pump S² is then put in motion and the valve S operated thereby, the compartments $d$ and $e$ being filled with steam and water through their inlet-pipes. The first stroke of the engine will carry one port $f'$ and one port $f$ into line with the openings, respectively, of one chamber $e$ and one chamber $d$, the remaining ports $f$ $f'$ being out of line. This operation will permit of the entrance of steam into the compartment $g$ and water into the compartment $g'$, or vice versa, while the return-stroke of the engine will cause the remaining ports $f$ and $f'$ to be brought in line with their corresponding openings, and thus admit steam into the compartment into which water was first admitted and water into that compartment into which steam was first admitted, a vacuum being formed in that compartment into which the water is admitted upon the steam and the discharge of all matter being provided for from the suction-pipe communicating with the remaining compartment in which the steam has been admitted upon the water. It will be understood that when a vacuum is formed in the chamber $g$ the valve O' of the pipe N' will be opened, thus allowing of the entrance into said pipe of the matter brought up through the telescopic pipes, the valve O of pipe N being closed at the same time, because of the fact that the water is being forced from compartment $g'$ by the admission of steam upon such water. When matter is being discharged from pipe N, the valve P' of the Y P seats upon that arm of the Y which communicates with pipe N', allowing of the discharge of all matter to be discharged from pipe N into the common discharge-pipe Q, such valve being seated upon the arm communicating with the pipe N when the discharge is being made through pipe N'.

By the construction of the parts as hereinbefore described it will be seen that a double-acting vacuum-pump is provided to operate in connection with the suction-pipes of a hydraulic dredging-machine, the operation of the machine being thus made continuous and the amount of power and labor and time involved being greatly lessened by the use of such parts.

Having thus described my invention, what I claim as new therein, and that which I desire to secure by Letters Patent, is—

1. In a hydraulic dredger, the combination, with suitable suction and discharge pipes, and a box D, connected with such suction-pipes, of a double-acting vacuum-pump arranged horizontally of the deck of such machine, as and for the purpose set forth.

2. In a hydraulic dredger, the combination, with suitable suction and discharge pipes, and a box D, connected with such suction-pipes, of a double-acting vacuum-pump arranged horizontally of the deck of the dredge, each suction-pipe communicating with a separate vacuum-chamber, as and for the purpose set forth.

In testimony whereof I affix my signature in presence of two witnesses.

JOHN McFARLANE.

Witnesses:
M. J. CLAGETT,
GEORGE H. PARMELEE.